A. E. GEPHART.
SPRING MOTOR DRIVEN VEHICLE.
APPLICATION FILED SEPT. 6, 1916.
1,217,935.
Patented Mar. 6, 1917.
3 SHEETS—SHEET 1.
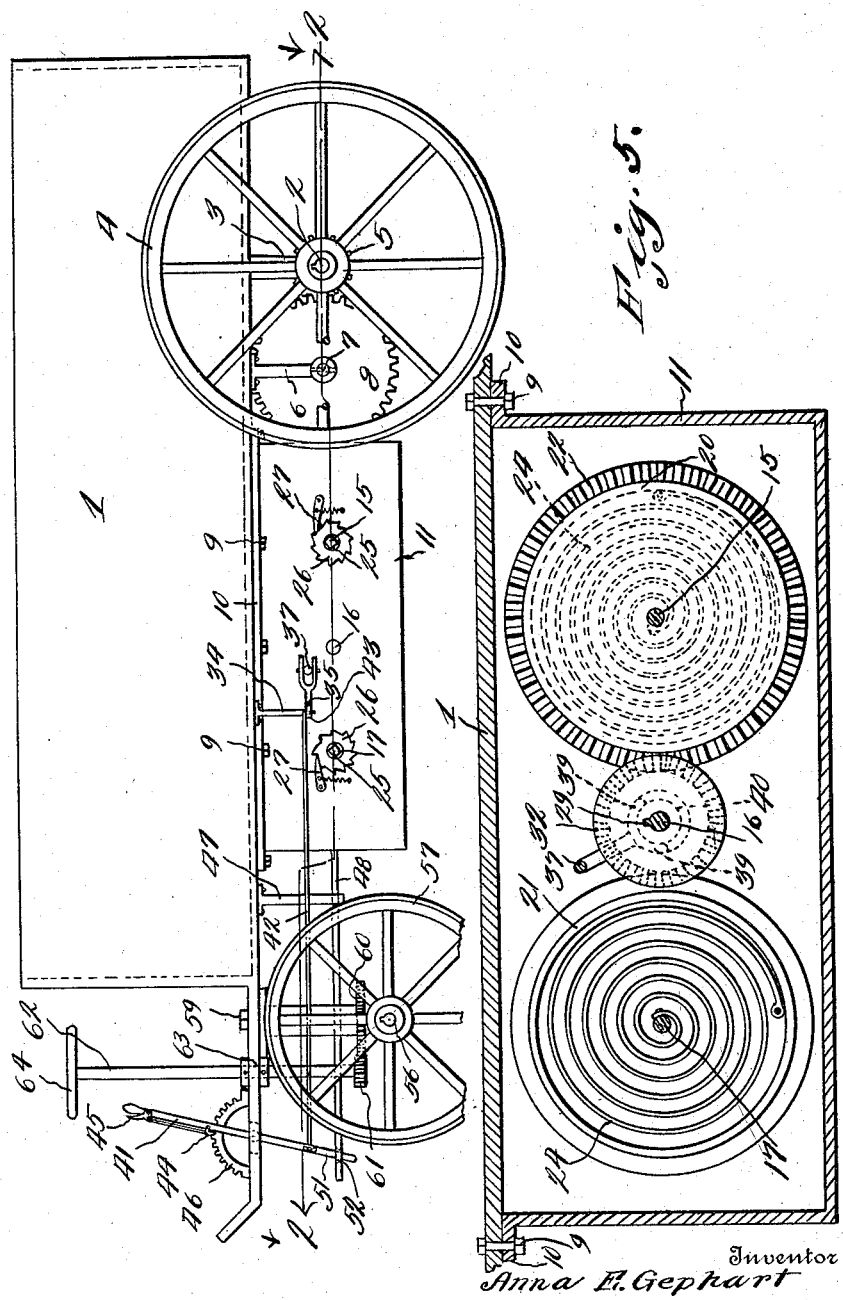
Inventor
Anna E. Gephart
Witnesses
By
Attorneys

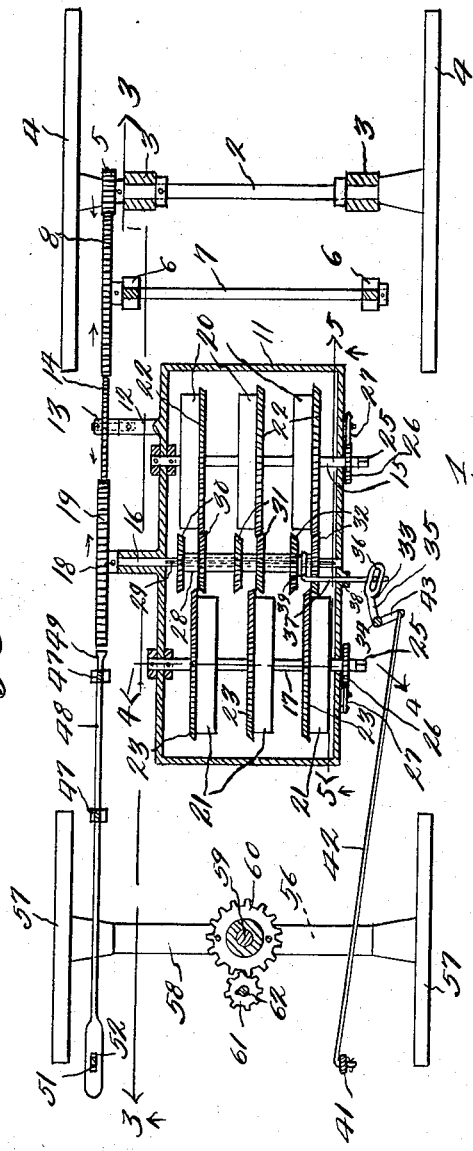

A. E. GEPHART.
SPRING MOTOR DRIVEN VEHICLE.
APPLICATION FILED SEPT. 6, 1916.
1,217,935.
Patented Mar. 6, 1917.
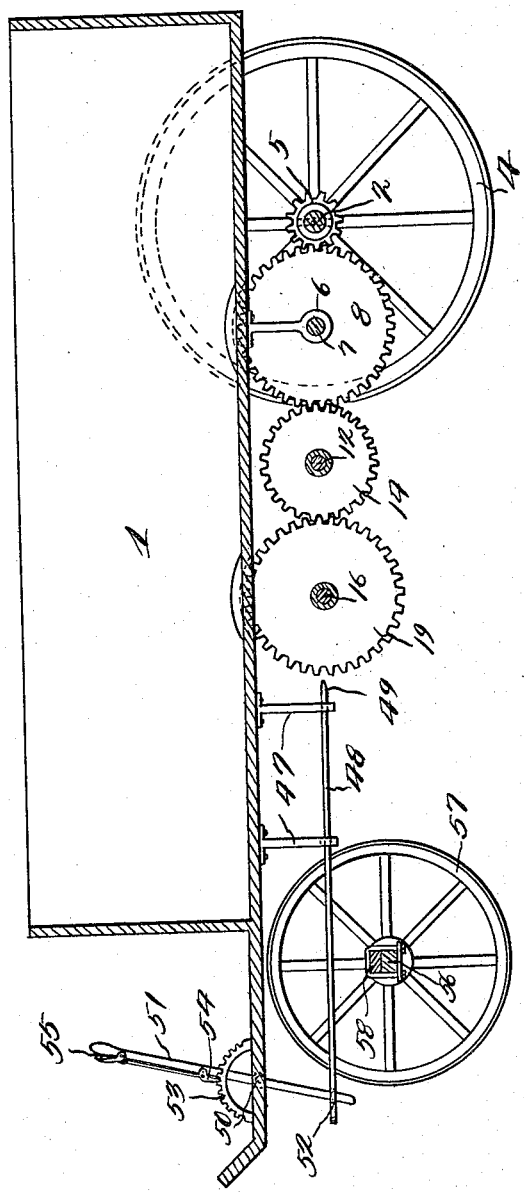
Inventor
Anna E. Gephart

UNITED STATES PATENT OFFICE.

ANNA E. GEPHART, OF MANSFIELD, OHIO.

SPRING-MOTOR-DRIVEN VEHICLE.

1,217,935.  Specification of Letters Patent.  Patented Mar. 6, 1917.

Application filed September 6, 1916. Serial No. 118,725.

*To all whom it may concern:*

Be it known that I, ANNA E. GEPHART, a citizen of the United States, residing at Mansfield, in the county of Richland, State of Ohio, have invented a new and useful Spring - Motor - Driven Vehicle; and I do hereby declare the following to be a full, clear, and exact description of the invention, such as will enable others skilled in the art to which it appertains to make and use the same.

This invention relates to an improved spring motor-driven vehicle, and an object of the invention is to provide a casing to be secured upon the under face of the bottom of the body of the vehicle and having a multiple of spring - driven drums mounted therein, which drums, in turn, are provided with gears, in combination with means to be shifted and having gears to engage first one set of gears of the drums, and then another set of gears, whereby power may be transmitted to the rear axle of the vehicle.

A further object of the invention is to provide means for shifting the shifting means.

A further object of the invention is to provide means for releasing and stopping the motor driven vehicle.

In practical fields the details of construction may necessitate alterations falling within the scope of what is claimed.

The invention comprises further features and combinations of parts hereinafter set forth, shown in the drawings and claimed.

In the drawings:—

Figure 1 is a view in side elevation of the improved motor-driven vehicle constructed in accordance with the invention.

Fig. 2 is a horizontal sectional view on line 2—2 of Fig. 1.

Fig. 3 is a vertical sectional view on line 3—3 of Fig. 2.

Fig. 4 is a sectional view on line 4—4 of Fig. 2.

Fig. 5 is a sectional view on line 5—5 of Fig. 2.

Referring more especially to the drawings, 1 designates a conventional form of body of the vehicle and 2 denotes the rear axle which is rotatable in bearings 3 and revoluble with the axle 2 are the rear supporting driving wheels 4. Also movable with one end of the axle 2 is a pinion 5. Mounted in bearings 6 projecting down from the bottom of the body of the vehicle is a shaft 7, on one end of which a gear 8 is mounted, which, in turn, meshes with the pinion 5, as shown in Figs. 2 and 3. Secured by bolts 9 to the under face of the bottom of the body of the vehicle is the flange 10 of a casing 11, from one side of which a stub shaft 12 extends. Secured on the stub shaft revolubly by means of the nut 13 is a gear 14, which meshes with the gear 8.

Mounted in bearings of the casing 11 are three shafts 15, 16 and 17. Mounted upon one end of the shaft 16 by means of the pin 18 is a gear 19, which, in turn, meshes with the gear 14, so that when motion is imparted to the shaft 16 power is transmitted through the chain of gears 5, 8, 14 and 19 to the rear axle 2.

Mounted upon the shafts 15 and 17 are two sets of drums 20 and 21, the drums 20 being on one side of the shaft 16 and the other set of drums 21 upon the opposite side of the shaft 16.

The drums 20 and 21 are provided with beveled gears 22 and 23. It is to be noted that the beveled gears 22 are disposed reverse to the beveled gears 23. In other words, the bevels of the gears 22 extend in a direction opposite to the bevels of the gears 23.

Mounted in the drums 20 and 21 are heavy strong coiled springs 24, one end of each of which is secured to its respective shaft, the other end of each of which is secured to the inner face of its respective housing drum. One end of each shaft 15 and 17 is provided with a rectangular extremity 25, to be engaged by a suitable wrench, whereby the shaft may be rotated to wind its respective springs. Each shaft 15 and 17 near its rectangular extremity 25 has secured thereon a ratchet wheel 26, which is engaged by a spring tensioned pawl 27, to prevent retrograde movement of the shaft as it is rotated for winding its respective springs.

Mounted upon the shaft 16 to rotate therewith by means of the key or feather 29, but to move axially thereon, is a sleeve 28 which is provided with a multiplicity of gears 30, 31 and 32. The gears 30 are adjacent each other, and their bevels extend toward one another, so that when the sleeve is shifted in one direction one of the gears 30 will mesh with one of the gears 22, and when shifted in the opposite direction the other gear 30 will mesh with one of the gears 23. The gears 31 and 32 are correspondingly arranged but with respect to the other gears 22 and 23. Therefore, it will be understood that by virtue of the heavy strong coiled springs, revoluble movement is imparted to the drums, which, in turn, transmit the movement to the shaft 16 and thence to the rear axle 2 through the medium of the chain of gears.

Extending down from the body of the vehicle to one side of the casing 11 is an arm 34, on the lower end of which a bell crank lever 35 is pivoted. One arm 33 of the lever has an elongated slot 36 to be engaged by the reciprocating rod 37 which is mounted in a guide bearing 38 on the side of the casing 11 and which rod 37 has forks 39 at one end, to engage an annular groove 40 in one end portion of the sleeve 28, as shown clearly in Figs. 2 and 5, so that when the rod 37 is reciprocated the sleeve is shifted axially, so as to disengage one set of gears carried by the sleeve from engagement from one or the other of the sets of gears 22 and 23.

Pivoted on the forward portion of the body 1 is a lever 41, to the lower end of which a rod 42 is connected. The rear end of the rod 42 is, in turn, pivoted to the arm 43 of the bell crank lever 33. The lever 41 is provided with a dog 44 operated by a hand grip 45, so as to engage and disengage the teeth of the segment 46. The dog 44 constitutes means to hold the lever 41 in different adjusted positions. By oscillating the lever 41, the sleeve 28 may be shifted.

While the springs of one set of drums are furnishing power to the shaft 16, for driving the axle 2, the springs of the other set of drums may be wound, and vice versa.

Mounted in guides of the arms 47 which extend downwardly from the body of the vehicle is a rod 48, the extremity 49 of which is designed to engage between any two teeth of the gear 19, to hold the gear at rest and prevent the shaft 16 from turning. Secured to the forward portion of the body 1 by means of a pivot 50 is a lever 51, the lower end of which engages an eye 52 of the rod 48, so that when the lever 51 is oscillated in one direction or the other, the rod 48 is reciprocated, so that its extremity may be thrown into and out of engagement with the teeth of the gear 19. A toothed segment 53 is carried by the forward portion of the body 1 and is engaged by a dog 54 (which may be manipulated by the hand grip 55) to hold the lever 51 in different adjusted positions.

A forward axle 56 is provided and is supplied with the forward wheels 57. This axle 56 is secured to the usual bolster 58 which is mounted upon the usual king bolt 59 and movable with the bolster is a gear 60, with which the gear 61 meshes. The gear 61 is carried by the lower end of the usual steering column 62 mounted in a bearing 63 of the body of the vehicle and provided with a hand wheel 64, whereby upon rocking the steering column 62 the forward axle will be oscillated in one direction or the other by virtue of the gears 60 and 61, in order to steer the vehicle.

The invention having been set forth, what is claimed as new and useful is:—

1. In a spring motor vehicle, the combination of an axle to be driven and a chain of gears for rotating the axle, of a casing secured to the body of the vehicle, a pair of shafts mounted in the casing each having a multiplicity of spring-driven drums provided with beveled gears, and means having connections with said chain of gears and to be shifted from engagement with one set of gears in engagement with the opposite set of gears, whereby motion is imparted to said chain of gears.

2. In a spring motor vehicle, the combination of an axle to be driven and a chain of gears for rotating the axle, of a casing secured to the body of the vehicle, a pair of shafts mounted in the casing each having a multiplicity of spring-driven drums provided with beveled gears, the bevels of one set extending in a direction opposite to the bevels of the other set, a shaft mounted in the casing, a sleeve rotatable with and slidable on the last-named shaft and having three sets of beveled gears coöperating with first one set and then the other of the first gears to transfer power from the spring-driven drum to the chain of gears.

3. In a spring motor vehicle, the combination of an axle to be driven and a chain of gears for rotating the axle, of a casing secured to the body of the vehicle, a pair of shafts mounted in the casing each having a multiplicity of spring-driven drums provided with beveled gears, the bevels of one set extending in a direction opposite to the bevels of the other set, a shaft mounted in the casing, a sleeve rotatable with and slidable on the last-named shaft and having three sets of beveled gears coöperating with first one set and then the other of the first gears to transfer power from the spring-driven drum to the chain of gears, and means for shifting said sleeve.

4. In a spring motor vehicle, the combination of an axle to be driven and a chain of gears for rotating the axle, of a casing secured to the body of the vehicle, a pair of shafts mounted in the casing each having a multiplicity of spring-driven drums provided with beveled gears, the bevels of one set extending in a direction opposite to the bevels of the other set, a shaft mounted in the casing, a sleeve rotatable with and slidable on the last-named shaft and having three sets of beveled gears coöperating with first one set and then the other of the first gears to transfer power from the spring-driven drum to the chain of gears, means for shifting said sleeve, and means for preventing the spring-operated drums from retrograde movement.

5. In a spring motor vehicle, the combination of an axle to be driven and a chain of gears for rotating the axle, of a casing secured to the body of the vehicle, a pair of shafts mounted in the casing each having a multiplicity of spring-driven drums provided with beveled gears, the bevels of one set extending in a direction opposite to the bevels of the other set, a shaft mounted in the casing, a sleeve rotatable with and slidable on the last-named shaft and having three sets of beveled gears coöperating with first one set and then the other of the first gears to transfer power from the spring-driven drum to the chain of gears, means for shifting said sleeve, and a device to coöperate with one of the gears of the chain of gears to hold the last-mentioned shaft against operation.

6. In a spring motor vehicle, the combination of an axle to be driven and a chain of gears for rotating the axle, of a casing secured to the body of the vehicle, a pair of shafts mounted in the casing each having a multiplicity of spring-driven drums provided with beveled gears, the bevels of one set extending in a direction opposite to the bevels of the other set, a shaft mounted in the casing, a sleeve rotatable with and slidable on the last-named shaft and having three sets of beveled gears coöperating with first one set and then the other of the first gears to transfer power from the spring-driven drums to the chain of gears, means for shifting said sleeve, a device to coöperate with one of the gears of the chain of gears to hold the last-mentioned shaft against operation, and means for preventing retrograde movement of the spring-operated drum.

In testimony whereof I have signed my name to this specification in the presence of two subscribing witnesses.

ANNA E. GEPHART.

Witnesses:
LEWIS W. STEVENSON,
JOSEPHINE STEVENSON.

Copies of this patent may be obtained for five cents each, by addressing the "Commissioner of Patents, Washington, D. C."